US009704188B1

(12) United States Patent
Ledet

(10) Patent No.: US 9,704,188 B1
(45) Date of Patent: *Jul. 11, 2017

(54) METHOD AND APPARATUS OF CREATING ELECTRONIC FORMS TO INCLUDE INTERNET LIST DATA

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,715

(22) Filed: Nov. 25, 2015

Related U.S. Application Data

(63) Continuation of application No. 12/511,112, filed on Jul. 29, 2009, now Pat. No. 9,223,770.

(51) Int. Cl.
*G06F 17/24* (2006.01)
*G06F 17/30* (2006.01)
*G06Q 30/06* (2012.01)
*G06F 3/0484* (2013.01)

(52) U.S. Cl.
CPC ..... *G06Q 30/0625* (2013.01); *G06F 3/04842* (2013.01); *G06F 17/243* (2013.01); *G06F 17/30554* (2013.01)

(58) Field of Classification Search
CPC ............... G06F 17/30675; G06F 17/30867
See application file for complete search history.

(56) References Cited

U.S. PATENT DOCUMENTS

| 5,557,787 | A | * | 9/1996 | Shin | G06F 17/246 |
| 6,732,102 | B1 | * | 5/2004 | Khandekar | G06F 17/3061 |
| 8,661,015 | B2 | * | 2/2014 | Karana | G06F 17/30286 |
| | | | | | 707/706 |
| 2001/0032205 | A1 | * | 10/2001 | Kubaitis | G06F 17/30864 |
| 2002/0152234 | A1 | * | 10/2002 | Estrada | G06F 17/243 |
| | | | | | 715/201 |
| 2003/0033164 | A1 | * | 2/2003 | Faltings | G06Q 10/02 |
| | | | | | 705/6 |

(Continued)

OTHER PUBLICATIONS

Extract Data—Grab HTML tables to Excel spreadsheets, Oct. 23, 2008, pp. 1-6 http://blog.outwit.com/?p=54.*

(Continued)

*Primary Examiner* — Scott Baderman
*Assistant Examiner* — Mario M Velez-Lopez
(74) *Attorney, Agent, or Firm* — Haynes and Boone, LLP

(57) ABSTRACT

A method and apparatus are disclosed that create an electronic form based on table data provided by Internet searching operations. One example may include determining at least one search term, querying, via a server, information provided by at least one network based on the search term, and copying at least one data table resulting from the information discovered during the querying operation. Additional operations may include parsing the at least one data table and storing the information in the server, displaying the data table to an end user so that the end user may select whether the data table should be included in the electronic form, and providing the user with the option to select and edit the contents of the data table. Upon the user's approval the data table may be copied into the electronic form.

20 Claims, 9 Drawing Sheets

(56) References Cited

U.S. PATENT DOCUMENTS

| | | | | |
|---|---|---|---|---|
| 2003/0225755 | A1* | 12/2003 | Iwayama | G06F 17/3071 |
| 2004/0049730 | A1* | 3/2004 | Ishizaka | G06F 17/246 |
| | | | | 715/213 |
| 2004/0172591 | A1* | 9/2004 | Rothschiller | G06F 17/30914 |
| | | | | 715/212 |
| 2005/0050088 | A1* | 3/2005 | Kotler | G06F 17/245 |
| 2005/0108107 | A1* | 5/2005 | Grayson | G06Q 30/02 |
| | | | | 705/26.1 |
| 2005/0132228 | A1* | 6/2005 | Ende | G06F 21/604 |
| | | | | 726/4 |
| 2006/0122872 | A1* | 6/2006 | Stevens | G06Q 10/02 |
| | | | | 705/5 |
| 2006/0173834 | A1* | 8/2006 | Brill | G06F 17/30554 |
| 2007/0027839 | A1* | 2/2007 | Ives | G06F 17/30905 |
| 2007/0046672 | A1* | 3/2007 | Shinohara | G06F 17/211 |
| | | | | 345/440 |
| 2007/0112606 | A1* | 5/2007 | Deljo | G06Q 10/02 |
| | | | | 705/5 |
| 2007/0220415 | A1* | 9/2007 | Cheng | G06F 15/00 |
| | | | | 715/212 |
| 2007/0240032 | A1* | 10/2007 | Wilson | G06F 17/2229 |
| | | | | 715/209 |
| 2008/0072138 | A1* | 3/2008 | Cragun | G06F 17/30011 |
| | | | | 715/236 |
| 2008/0285792 | A1* | 11/2008 | Comay | G06F 17/243 |
| | | | | 382/100 |
| 2009/0083652 | A1* | 3/2009 | Krasner | G06F 17/30557 |
| | | | | 715/772 |
| 2009/0177961 | A1* | 7/2009 | Fortini | G06F 17/2247 |
| | | | | 715/239 |
| 2010/0083105 | A1* | 4/2010 | Channabasavaiah | G06F 17/30867 |
| | | | | 715/273 |
| 2010/0318889 | A1* | 12/2010 | Billharz | G06F 17/243 |
| | | | | 715/212 |
| 2011/0106567 | A1* | 5/2011 | Asher | G06Q 40/08 |
| | | | | 705/4 |
| 2012/0191492 | A1* | 7/2012 | Diba | G06Q 10/025 |
| | | | | 705/6 |
| 2012/0311426 | A1* | 12/2012 | Desai | G06F 17/2705 |
| | | | | 715/227 |

OTHER PUBLICATIONS

"Importing HTML and ASP Data Into Excel", Feb. 15, 2009, pp. 1-7 http://mrkent.com/tools/converter.*

Creating a Drop Down List in Excel 2007, Apr. 6, 2008, pp. 1-2 http://spreadsheets.about.com/od/datamanagementinexcel/qt/20071113_drpdwn.htm.*

William W. Cohen, "Learning Page-Independent Heuristics for Extracting Data from Web Pages", Mar. 3, 2001, pp. 1-14 http://www8.org/w8-papers/5a-search-query/learning/.*

TechRepublic "Pull data into Microsoft Excel with Web queries", Sep. 14, 2006, pp. 1-12 http://www.techrepublic.com/article/pull-data-into-microsoft-excel-with-web-queries/6115870.*

* cited by examiner

```
Pseudo Code For Parsing out HTML Tables while (moreLinesInInputFile) do currentLine = readLineFromInputFile()

if (checkAllWordsInLine("<table")

table[x].line[y] = currentLine y = y++ while(loop)

currentLine = readLineFromInputFile()

if checkAllWordsInLine("</table")

table[x].line[y] = currentLine y = y++ else x = x++ loop = false endif endWhile endif endWhile

// process the entire input file  // read the next line from the input file  // check if the line contains a table start
// if so, save the line in a local variable  // increment the local line counter  // loop until the end of table is found
// read the next line from the input file  // check if the line contains a table end  // if not, save the line in a local variable
// increment the local line counter  // else, increment local table counter  // done processing the current table
```

Select a table to use:

Table 1  ☐

| Total NFL Titles | |
|---|---|
| Team | Titles |
| Green Bay Packers | 12 |
| Chicago Bears | 9 |
| New York Giants | 7 |
| Dallas Cowboys | 5 |
| Indianapolis Colts | 5 |
| Pittsburgh Steelers | 5 |

Table 2  ☐

| Division | Team | City/Area | Stadium |
|---|---|---|---|
| | | | American Football Conference |
| East | Buffalo Bills | Orchard Park, NY² | Ralph Wilson Stadium² |
| | Miami Dolphins | Miami Gardens, FL | Dolphin Stadium |
| | New England Patriots | Foxborough, MA | Gillette Stadium |
| | New York Jets | East Rutherford, NJ | Giants Stadium³ |
| North | Baltimore Ravens | Baltimore, MD | M&T Bank Stadium |
| | Cincinnati Bengals | Cincinnati, OH | Paul Brown Stadium |
| | Cleveland Browns | Cleveland, OH | Cleveland Browns Stadium |
| | Pittsburgh Steelers | Pittsburgh, PA | Heinz Field |

Table 3  ☐

| Years Experience | Minimum Salary |
|---|---|
| 0 | $285,000 |
| 1 | $360,000 |
| 2 | $435,000 |
| 3 | $510,000 |

[Done]

 600

700

| Division | | Team | City/Area | Stadium |
|---|---|---|---|---|
| | | | | American Football Conference |
| East | | Buffalo Bills | Buffalo Bills | Ralph Wilson Stadium[3] |
| | | Miami Dolphins | Miami Dolphins | Dolphin Stadium |
| | | New England Patriots | New England Patriots | Gillette Stadium |
| | | New York Jets | New York Jets | Giants Stadium[3] |
| North | | Baltimore Ravens | Baltimore Ravens | M&T Bank Stadium |
| | | Cincinnati Bengals | Cincinnati Bengals | Paul Brown Stadium |
| | | Cleveland Browns | Cleveland Browns | Cleveland Browns Stadium |
| | | Pittsburgh Steelers | Pittsburgh Steelers | Heinz Field |
| South | | Houston Texans | Houston Texans | Reliant Stadium |
| | | Indianapolis Colts | Indianapolis Colts | Lucas Oil Stadium |
| | | Jacksonville Jaguars | Jacksonville Jaguars | Jacksonville Municipal Stadium |
| | | Tennessee Titans | | LP Field |
| West | | Denver Broncos | | INVESCO Field at Mile High |
| | | Kansas City Chiefs | | Arrowhead Stadium[4] |
| | | Oakland Raiders | | Oakland-Alameda County Coliseum |
| | | San Diego Chargers | | Qualcomm Stadium |
| | | | | National Football Conference |
| East | | Dallas Cowboys | | Dallas Cowboys New Stadium |
| | | New York Giants | | Giants Stadium[3] |
| | | Philadelphia Eagles | | Lincoln Financial Field |
| | | Washington Redskins | | FedEx Field |
| North | | Chicago Bears* | Chicago, IL | Soldier Field |
| | | Detroit Lions* | Detroit, MI | Ford Field |
| | | Green Bay Packers | Green Bay, WI | Lambeau Field |
| | | Minnesota Vikings | Minneapolis, MN | Hubert H. Humphrey Metrodome[5] |
| South | | Atlanta Falcons | Atlanta, GA | Georgia Dome |
| | | Carolina Panthers | Charlotte, NC | Bank of America Stadium |
| | | New Orleans Saints | New Orleans, LA | Louisiana Superdome |
| | | Tampa Bay Buccaneers | Tampa, FL | Raymond James Stadium |
| West | | Arizona Cardinals* | Glendale, AZ | University of Phoenix Stadium |
| | | St. Louis Rams* | St. Louis, MO | Edward Jones Dome |
| | | San Francisco 49ers | San Francisco, CA | Candlestick Park |
| | | Seattle Seahawks | Seattle, WA | Qwest Field |

Reason: ☐ ☐ ☐ ☐ ☐ ☐ ☐ ☐ ☐

[ Done ] [ Cancel ]

FIG. 7

List Represented in XML Notation

<NFLTeams>

<name> Buffalo Bills </name>

<name> Baltimore Ravens </name>

<name> Houston Texans </name>

<name> Denver Broncos </name>

<name> Miami Dolphins </name>

<name> Cincinnati Bengals </name>

<name> Indianapolis Colts </name>

<name> Kansas City Chiefs </name>

<name> New England Patriots </name>

<name> Cleveland Browns </name>

<name> Jacksonville Jaguars </name>

...

<name> Tampa Bay Buccaneers </name>

<name> St. Louis Rams </name>

</NFLTeams>

FIG. 8

METHOD AND APPARATUS OF CREATING ELECTRONIC FORMS TO INCLUDE INTERNET LIST DATA

CROSS-REFERENCE TO RELATED APPLICATIONS

This application is a continuation of U.S. application Ser. No. 12/511,112, filed Jul. 29, 2009, entitled METHOD AND APPARATUS OF CREATING ELECTRONIC FORMS TO INCLUDE INTERNET LIST DATA, which is incorporated herein in its entirety.

TECHNICAL FIELD OF THE INVENTION

This invention relates to an apparatus, method and computer program product that provide a dynamic electronic form creation application.

BACKGROUND OF THE INVENTION

Internet searching applications allow a user to search for almost any particular subject. Computer applications, both on the desktop, and within the browser (i.e., on the Internet) allow the user to manipulate search results and incorporate them into an application. Certain searching tools also exist to allow a user to search for almost anything and to obtain the answers in fractions of a second.

Electronic forms ("forms") may be utilized to gather information from users of desktop applications, and applications on the Internet. Forms can be custom designed to request or accept several different kinds of data input from the user. In addition, forms are normally tailored in various different configurations, according to pre-designed form structures or based on the requirements of the user of the form.

In one example of a conventional method to generate user-defined forms, certain components may be dragged and dropped, to create a form and a corresponding schema. Such a form may be utilized to gather input from a user of an application, and may be created graphically. For example, the form may be created by utilizing a form generation tool where the form designer may drag and drop certain data elements during the form creation process.

These applications that assist the user with creating forms may place several different types of input components on the form itself by offering dragging and dropping tools to place components on a visual canvas. These form creation applications may shield the user from the complex details included in the process of creating a schema, and may also provide the necessary tools to connect the form application to the back-end application stored away from the user.

While a user of a form design application has the ability to create forms without the need to understand programming language details, the user may still be limited to the pre-defined components in the application itself. The components of a form generation application provide only a fixed set of components (i.e., dropdown list component) that a user may select and utilize within the form. In addition, all of the elements in the dropdown list must be filled by data input from the user. The structure of the dropdown list may be pre-configured in the component list, however, the dropdown list may only be a generic and empty dropdown list that requires a complete set of input data.

SUMMARY OF INVENTION

Embodiments of the present invention may include a method of creating an electronic form that includes determining at least one search term, querying, via a server, information provided by at least one network based on the search term, and copying at least one data table resulting from the information discovered during the querying operation. The method may also include parsing the at least one data table and storing the information in the server, displaying the data table to an end user so that the end user may select whether the data table should be included in the electronic form, and providing the user with the option to select and edit the contents of the data table, and copying the data table into the electronic form.

Other embodiments of the present invention may include an apparatus configured to create an electronic form. The apparatus includes a processor configured to perform various operations. Those operations may include to determine at least one search term, querying, via a server, information provided by at least one network based on the search term, copy at least one data table resulting from said information discovered during said querying operation, and parse the at least one data table and store the information in the apparatus. Other operations may include to display the data table to an end user so that the end user may select whether the data table should be included in the electronic form, provide the user with the option to select and edit the contents of the data table, and copy the data table into the electronic form.

BRIEF DESCRIPTION OF THE DRAWINGS

FIG. 4 illustrates an example program code according to an example embodiment of the present invention.

FIG. 5 illustrates an example program code according to an example embodiment of the present invention.

FIG. 6 illustrates another example user interface according to an example embodiment of the present invention.

FIG. 7 illustrates a further example user interface according to an example embodiment of the present invention.

FIG. 8 illustrates an example list according to an example embodiment of the present invention.

DETAILED DESCRIPTION OF THE INVENTION

Figure 1:
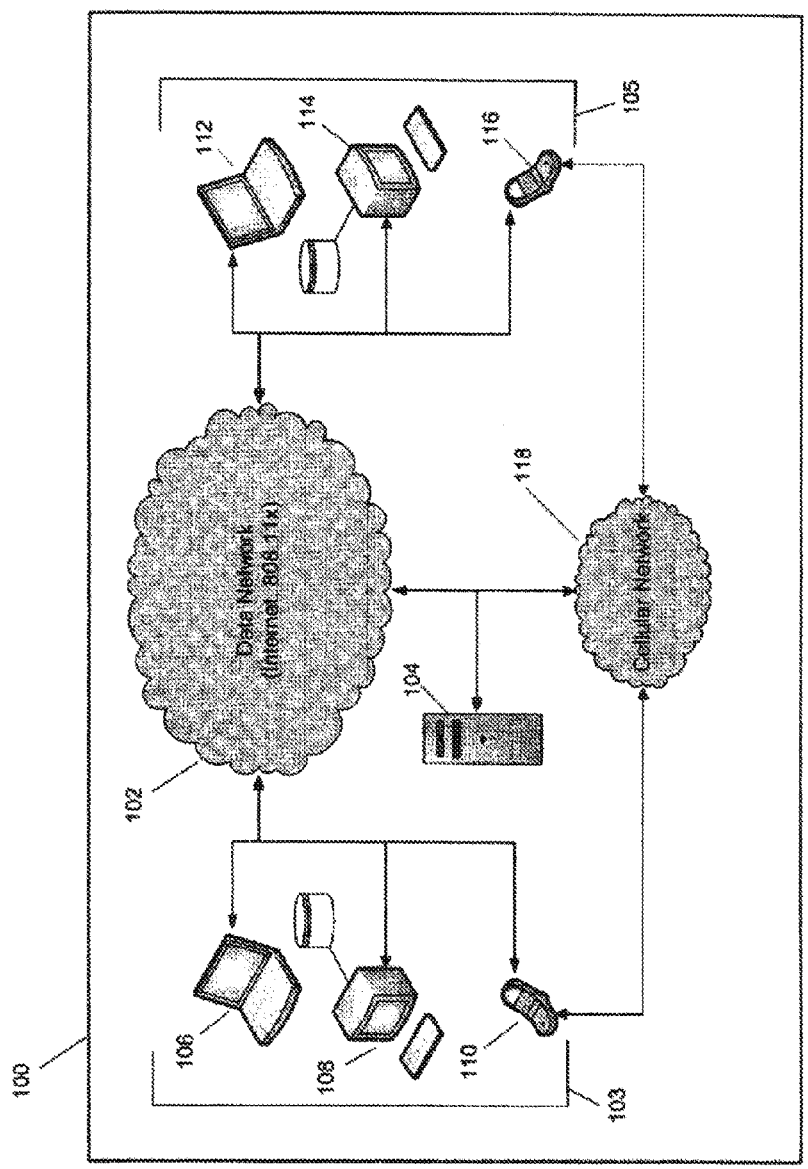
FIG. 1 illustrates an example network according to an example embodiment of the present invention.

An apparatus, method and computer program product are disclosed where both forms and a hierarchical schema are created to provide a dynamic form creation procedure.

It will be readily understood that the components of the present invention, as generally described and illustrated in the figures herein, may be implemented in a wide variety of different configurations. Thus, the following detailed description of the embodiments of a method, apparatus, and system, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment of the present invention. Thus, appearances of the phrases "example embodiments," "in some embodiments," "in other embodiments," or other similar language, throughout this specification do not necessarily all refer to the same group of embodiments, and the described features, structures, or characteristics may be combined in any suitable manner in one or more embodiments.

A form designer not knowledgeable about cascading style sheets (CSS) and extensible markup language (XML) program code, or, related schemas may create an electronic form and corresponding hierarchical schema using an automated form creation application. A hierarchical schema may be structured by other governed schemas allowing multiple individuals to provide input into their own custom designed schemas, which may be part of an overall governing schema. The hierarchical schema may be, for example, a XML-based schema, and/or an extensible style language family transformation (XSLT) type schema.

A user of a form designer application according to an embodiment of the present invention may select components and drop them on a form to create both a graphical display as well as have the component adapted to a hierarchal schema. For example, when a component is displayed to the user on a graphical design area of the form creation application, the user may click on the component, and an additional menu may be displayed that permits the user to perform additional functions. For example, a user may be capable of creating not only a dropdown list component on the form, but, also may be capable of creating a specific dropdown list containing certain list items already included as one of the form components.

In general a component may be defined as a GUI element included on a page. For instance, a dropdown component would be a GUI element that includes a list. A textbox component would be a box with text inside. Each of these example components represent portions of the GUI.

In one example, a user may desire to build a form for a fantasy football league based on the football teams in the national football league (NFL). It may be desired by the user to have a form that includes dropdown lists for various group topics related to the NFL. For instance, a first dropdown list may include all NFL teams, which may be selected by the user of the form. Another dropdown list, or sub-list, based on the first dropdown list may include all of the players on the active roster for team "X", which may have been selected from the first form. Several other lists may also be useful in this example form.

In addition, a user may desire to create a hybrid fantasy football league and combine NFL, college and even high school teams and players into one league. In such a case, multiple lists will have to be created and a dynamic list creation option will be necessary. The number of possible lists are endless according to what type of custom form the user is attempting to create. A user must be permitted to create customized list components.

Instead of relying on predefined list generation components that do not include any list items being predefined, a user may desire to create a form containing user defined specific list components. In designing a custom list on a form generation application, an automatic item generation tool may provide features which populate list components utilizing data from outside sources, such as, the Internet.

In one example according to embodiments of the present invention, data that is considered relevant to the subject matter of a particular list may be discovered from the Internet and copied into the content of the list. Such an operation may be performed at the user's direction or automatically based on predefined relevant content criteria associated with the list.

During a form creation procedure, the querying of the Internet may be performed without direct interaction from the current user (i.e., automatically). There are certain command line interface (CLI) and application program interfaces (APIs) which may be utilized to issue search commands from an application without direct user interaction.

One such application is Goose (aka GOOge SEarch). Goose allows a user to search Google's index of the Internet from a CLI. Goose uses Google's web APIs to execute searches and retrieve the corresponding results. Google's web APIs provide a simple, XML-based interface to their search engine by using simple object access protocol (SOAP). CLI web search is another CLI tool that may be utilized to interface the present list generation application of the present invention with Internet searching. CLI web search applications permit searching of multiple search sites including, for example, Google, Yahoo, Ask Jeeves, and Wikipedia, etc.

According to embodiments of the present invention, the form creation application will determine the search criteria, and will issue a query which will return a response in XML notation, or, any other notation compatible with the interacting software application. Utilizing data sources on the Internet, such as the popular online encyclopedia "Wikipedia" the user is able to create lists within the form that will include user defined elements from relevant and up-to-date data sources.

Referring specifically to the online encyclopedia "Wikipedia dot com", almost every page on the Wikipedia website displays content in a similar manner. For example, there is a "contents" area listing the specific sections of the webpage. All web page data is usually formatted as simple html that may be parsed without any problems. Those Html tables exist on each page and contain specific data pertaining to the pre-selected subject. These tables may be sought from a user defined search, copied in their entirety, and, configured to be used in list components in a user defined form.

The user may access the Internet via a computer connected wirelessly, a wired landline, a cellular telephone, or, any other method currently utilized to gain access to the public Internet, as illustrated in FIG. 1. Referring to FIG. 1, a computer networking system that supports the present invention is illustrated as a system 100, which includes a data network (i.e., the Internet) accessible via a landline connection or via a wireless connection. The wireless connection may be established by any wireless communications protocol 802.11x, etc.

The system 100 of FIG. 1 also illustrates a server 104 which may store a form creating application, and a cellular network 118, which may be accessed by the communications devices 103 or 116 which are capable of communication with the cellular network 118 to access the server 104 and/or the Internet 102. According to embodiments of the present invention, the client machines 103/105 may include any of a personal computer 108/114, a laptop computer 106/112, a mobile computing device, such as, a pocket PC or PDA (not shown), and a mobile station or cellular communications device 110/116. If the client is operating the cellular device 110/116, the server 104 can be accessed via the Internet 102 and/or the cellular network 118.

Each of the client machines 103/105 and the server 104 may include its own computer readable medium (i.e., RAM, ROM, hard disk, EEPROM or other memory type) to store software code or instructions, which may be accessed from a memory of the computer readable medium. Once the software code is accessed, it may be executed by a processor that is also part of the client machine. Executing the software code stored on the computer readable medium may provide a set of operations to be performed.

According to embodiments of the present invention, an existing form creating application may be accessed or downloaded from the server 104 and combined with another application used to generate the lists during the form generation procedure. Whether or not the form creating application resides on the client machine 103/105, is download from the server 104, or, the application is previously installed on the client's physical machine 103/105, the form creating application of the present invention may be combined with previously existing form creation applications.

In one example, the form creating application may reside on the server 104, or, may be download from the server 104 to the client's machine 103/105 via the client's browser application (e.g., Internet Explorer, Mozilla, FireFox, Netscape Navigator, Safari, etc.). For example purposes it may be assumed that certain form creating applications reside on the server 104.

In one example according to embodiments of the present invention, a user may create a form that will interact with an automated data form list obtaining application that will automatically obtain list elements (i.e., individual list items, such as, individual NFL team names) for a list component (i.e., NFL teams) needed for that form. For example, a window will be displayed, in which the user may enter a search string using any of the devices 103 or 105 that will be used to search the Internet 102 (see FIG. 2).

Figure 2:
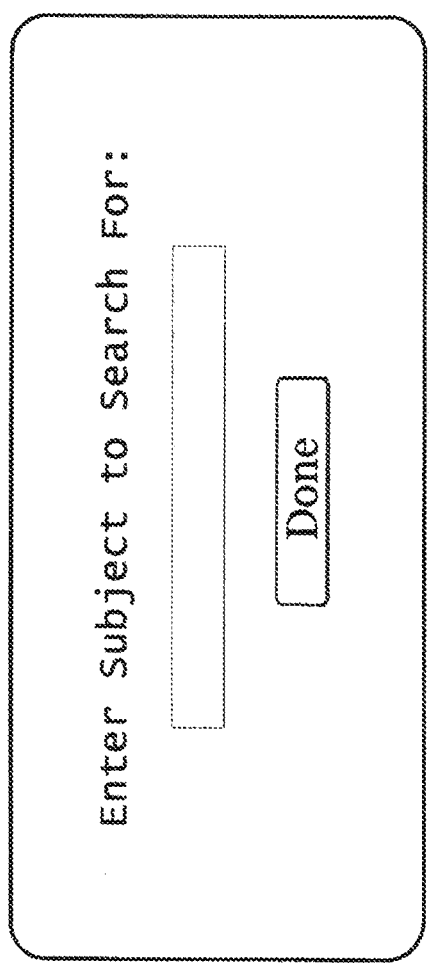
FIG. 2 illustrates an example user interface according to an example embodiment of the present invention.

Referring to FIG. 2, a simple window may be provided to offer the user a text area that is used to receive a search string. The user may enter an initial search, such as, "nfl", in an effort to begin the form creation process of creating an NFL fantasy football form. The process of handling the form creation process is illustrated in FIG. 3, which illustrates a sequence diagram that contains a visual representation of the processing operations included in the form generation process.

Figure 3:
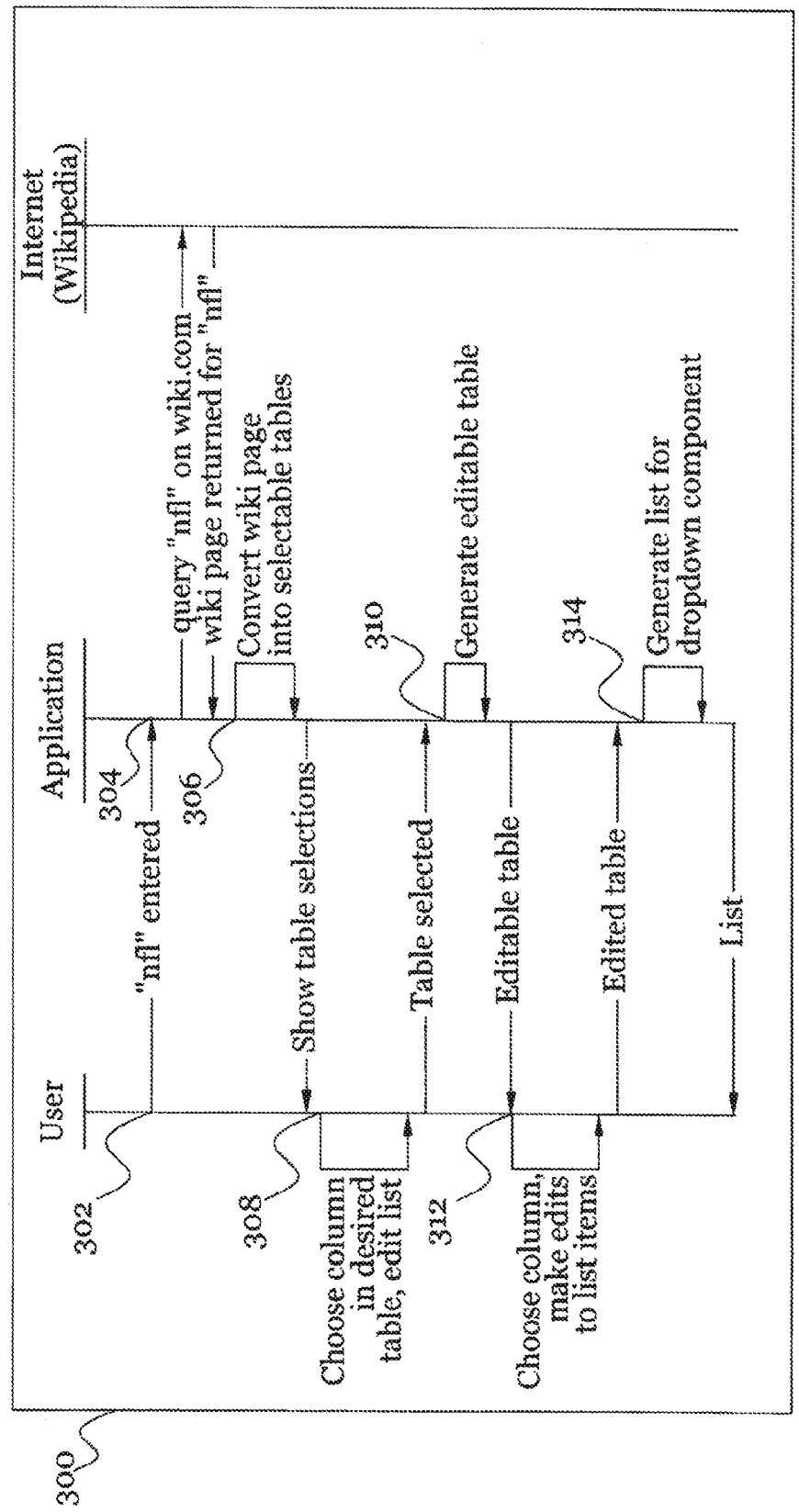
FIG. 3 illustrates an example message diagram according to an example embodiment of the present invention.

Referring to FIG. 3, the server 104 will accept the input "nfl" entered at operation 302, and conduct a search query 304 on the Internet 102. The page that is returned to the server 104 may initially be the main homepage of a corresponding website returned from the Internet 102 pertaining to the search string entered. For example, if Wikipedia is accessed via the search input "nfl", then the main Wikipedia page pertaining to "nfl" may be immediately accessed by the application 304.

Once, the Wikipedia page for "nfl" is returned, the server 104 will parse out the tables at operation 306 from the returned web page, and, as a result, generate a view of the tables that will show the parsed data table selections to the user for review. Displaying each table that was parsed out may further include the option to check a checkbox next to each of the tables generated. The user may then select the checkbox next to the table that is desired to be used at operation 308, and click a "Done" button once the selection is made. Such a selection will indicate to the server 104 which table the user prefers to utilize for the custom list component in the form.

The server 104 may then become aware of which table the user has selected, and a more detailed view may be generated at operation 310 based on the user's input. Next, a new view will be generated that contains more detailed information of the selected table. Every column in the table will be shown with a checkbox added to each of the column names, and the new view will be displayed to the user. In addition, other tables included in the webpage may also be incorporated into the form as separate tables or as sub-tables which represent data from the original table. For example, a table may include team names, and a sub-table may include players names for an individual team. Such sub-tables may be automatically generated and provided to the user for review, or, may be created at the user's direction.

The user may now perform additional edits to the list information and the column selections before accepting the final column and list information. This may be performed by selecting a checkbox corresponding to one of the columns. The selection of the column by the user indicates that the items in the list component on the new form should contain the elements in that column of the table at operation 312. When the checkbox in a column is selected, a pop up window may be displayed to the user allowing the user to make the necessary edits to the list.

Finally, the user selects the "Done" button indicating that the edits to the list is complete which indicates to the server 104 that the data is ready to be delivered to the user for inclusion in the list component of the form. The server 104 will then generate a list of items for the list component 314. This list of items can be in any format that the form generation software application is able to accept (i.e., XML or XSLT, or any other suitable format).

Another example is provided in further detail based on embodiments of the present invention. For example, assuming that the user desires to create a form that may be used by other users to create their own fantasy football league. One of the components in the form will be a dropdown list of all the NFL teams, and, a sub-list of the team list may include the player roster for that entire football team.

Figure 4:
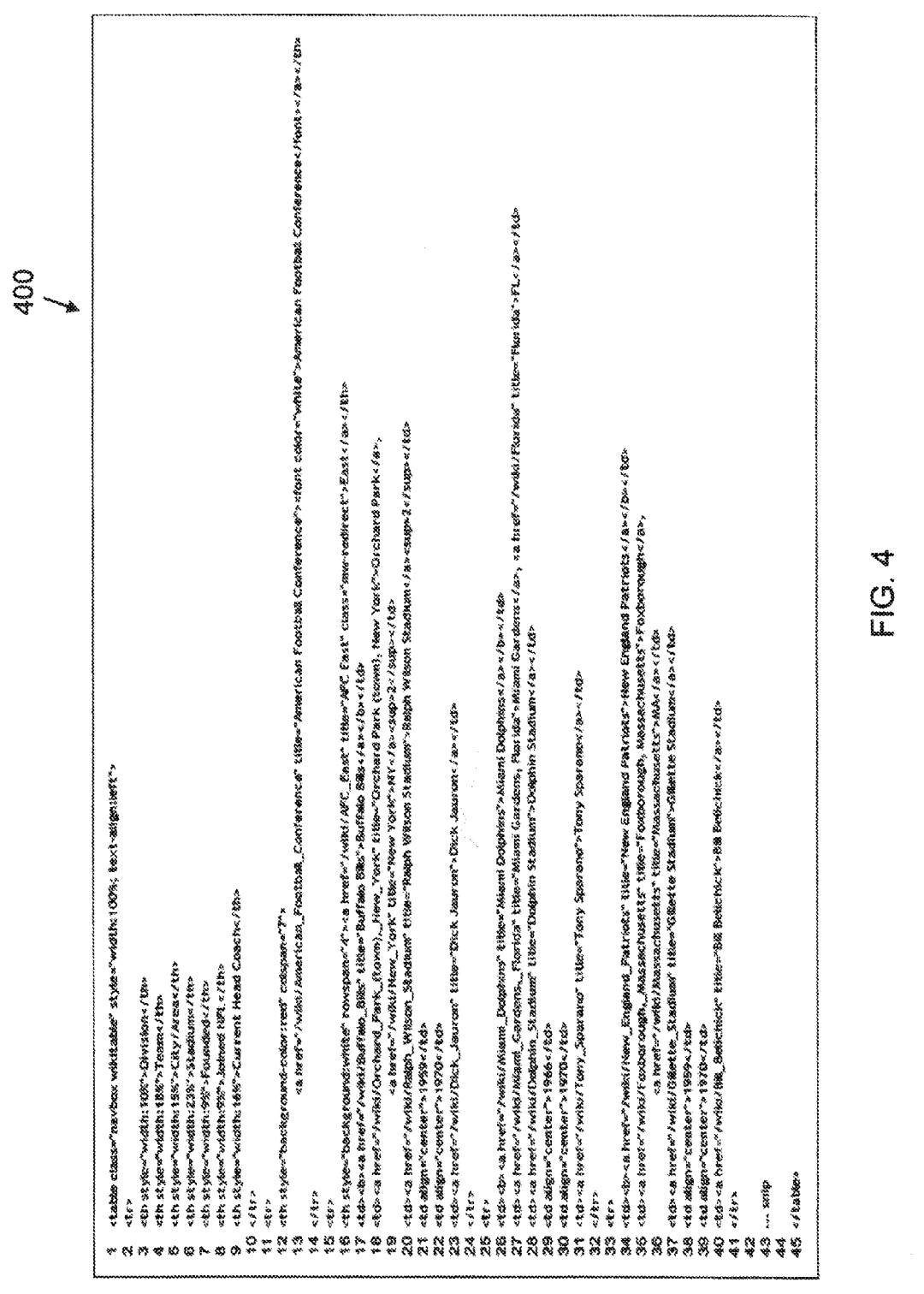

As noted previously, a user may be presented with a text field where a subject is entered and upon clicking on the "Done" button, the Internet 102 is searched (see FIG. 2). Once the user enters "nfl" into the text field and clicks the "Done" button, the server 104 parses the returned Internet page for any Internet formatted tables related to that particular subject search, such as, html tables. The server 104 may then extract the tables from the web page, and return a summary of all of the tables to the user. FIG. 4 depicts a summary of the html code 400 that may be parsed from the html code of the web page returned from the initial search operation. The html code may be copied from the Internet website and stored in the server 104 prior to being parsed.

Referring to FIG. 4, the parsed html table begins with the <table> notation, and ends with the </table> notation. Each row of the table begins with a <tr> notation, and each column within the row begins with a <td> notation. All of the html tables may follow an equivalent notation making it possible to extract the html table from the web page, and perform additional processing to the html code with relative uniformity.

FIG. 5 depicts the pseudo-code 500 that may be used to parse out a table from a returned web page according to example embodiments of the present invention. Referring to FIG. 5, when a web page is received from the Internet 102, the server 104 parses through each line of the html web page by searching for the string that denotes the beginning of an html table (i.e., "<table>"). When such a string is found, the string, along with related strings may be copied to a temporary storage location until the end of table, (i.e., "</table>") is discovered. The server 104 may continue these operations until it has obtained an array of multiple html tables from the returned web page. Such tables may be defined by a local variable.

Once the server 104 has obtained the parsed tables in a local variable, those tables may be consolidated into a single element. In other words, the various tables that were parsed may be readily inserted into any programming component that provides support for an html string. This will enable the server 104 to have the ability to format a new view or window for the user to view the parsed html tables, and, where additional visual components may be added for user interaction (i.e. checkboxes, etc.).

FIG. 6 illustrates a potential rendition 600 of the parsed tables returned to the user from the web search, according to embodiments of the present invention. Referring to FIG. 6, each of the local tables (i.e., tables 1-3) are displayed into a divided section of the user's view. In one example, two components are added above the html tables. First, a label component that provides a numbering scheme for each of the tables to an internal numeric representation (i.e., 1-3). Second, a checkbox is added that corresponds to each numbered table enabling the server 104 to accept user input of a selected table.

As may be observed from FIG. 6, a fade has been applied to the html tables to indicate the continuing of the column and/or row data beyond the view displayed to the user. If desired by the user, it may be preferable to replace this shaded rendition of the table data with scrollbars, depending on the designer's preference. Also added to the user's display is a division bar used to enhance the user's visual representation and provide additional organization to the user's display.

Such a view, enables a user to select individual tables that may be used in the user's custom designed electronic form. For instance, by checking the checkbox associated with the desired table and pressing the "Done" button, the server 104 may return the user with a more detailed view of the selected table(s), which provides the user with the added capability to select an individual column desired to be a list component. In addition, the user may also be permitted to add, remove, or edit the selections in the list to correct, expand or finalize the list prior to obtaining a completed custom designed form.

FIG. 7 illustrates an example rendition 700 according to embodiments of the present invention. Referring to FIG. 7, once a user has selected certain tables to be included as part of the electronic form, a rendition of the selected table(s) may be returned to the user. In FIG. 7, the selected table(s) have been returned, and modified to include data about the table(s) the user selected. Each column title "Division", "Team", "City/Area", "Stadium", in the table, includes a checkbox. This checkbox provides the user with the ability to notify the server 104 of which columns may be of interest to the user. However, the checkboxes added to the columns are merely potential design considerations, which may be easily replaced or complemented by other tools used to interact with the user's preferences or design selections. Any design option may be employed to receive the user's column selections.

In one example, assume that the user in the above example selected Table 2 (see FIG. 6), and the "Team" column was desired by the user to be included in the dropdown list of the user defined list component in the form. In such a case, the user would then click the checkbox next to Table 2, and click the "Done" button illustrated in FIG. 6. This action would prompt the server 104 to format Table 2 into a view that would provide the user with additional options for modifying the columns within the established table. FIG. 7 illustrates Table 2 in an editable view that allows the user to perform edits and modifications to craft a custom designed table.

As may be viewed from FIG. 7, the checkbox "Team" is selected. This action of selecting the "Team" column checkbox may prompt the server 104 to display a modal popup window that places all focus of the display on a popup window. Such a modal popup window provides the user with access to the specific elements of the column in an editable list. This provides the user with access to the most fundamental element of the list, so that individual elements (i.e., individual NFL teams) may be removed, added, or kept on the list.

At this stage, the user has the option to edit any of the elements in the list by typing an alternative name in the textbox for each of the elements. As such, shortened names, nick-names, etc., may also be used to modify the elements accordingly. The user may remove an element by selecting the checkbox in the "Remove" column. The user will also have the ability to add additional elements to the list at the bottom of the list (not specifically shown).

If the user were to select the "Cancel" button, the popup button will be removed allowing the user to select another column to edit. The checkboxes for the column selections can be arranged in a radio style, meaning that only one column can be selected or edited at any given time. In this example, when one checkbox is selected, all other selections are cleared. This provides a more organized procedure to handle the column editing process. Alternatively, no radio style button procedures may be required and editing may be performed openly without any restrictive measures.

If the user were to instead select the "Done" button, this will indicate that the list is supposed to be included in a user-defined list component of the electronic form. The server 104 will generate a list of items for the list component in any notation acceptable for use by the form creating software application (i.e., XML or XSLT).

An example list 800 represented in XML notation is illustrated in FIG. 8, according to example embodiments of the present invention. Referring to FIG. 8, assuming that XML notation is utilized. FIG. 8 illustrates a summary of the previous example's list data in XML format. These list elements (i.e., Buffalo Bills, etc.) may be included as a list component (i.e., NFL teams), that is custom designed by the user. The list may then be sent to the user to be further edited and/or interworked with the form generation software application. The list as a whole will likely be utilized as list item elements in the dropdown of the form component being created.

Figure 9:
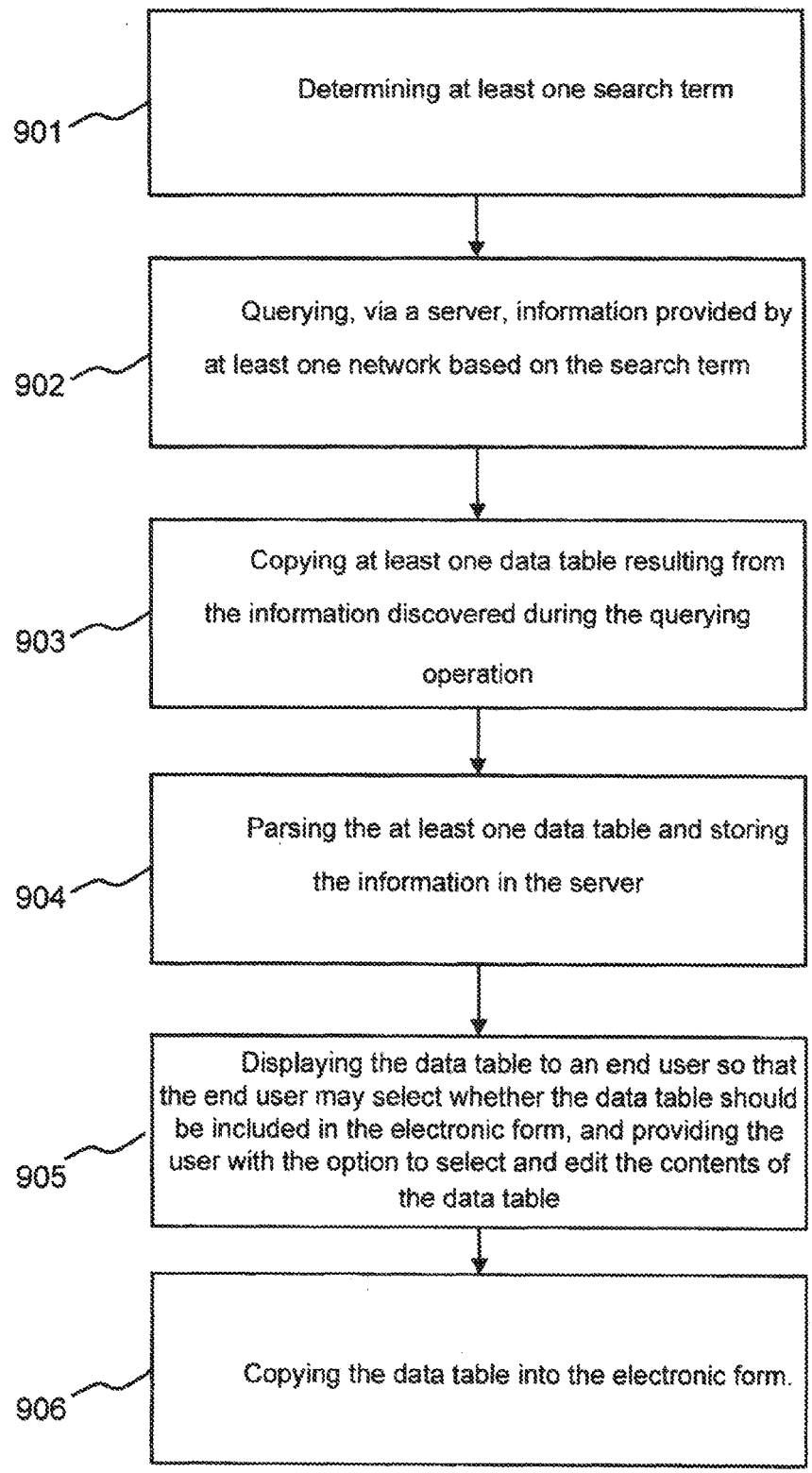
FIG. 9 illustrates an example method according to an example embodiment of the present invention.

A method of creating an electronic form, according to embodiments of the present invention may include determining at least one search term at operation 901 of FIG. 9. The method may also include querying, via a server, information provided by at least one network based on the search term at operation 902, copying at least one data table resulting from the information discovered during said querying operation at operation 903, and parsing the at least one data table and storing the information in the server at operation 904. Other operations may include displaying the data table to an end user so that the end user may select whether the data table should be included in the electronic form at operation 905, and providing the user with the option to select and edit the contents of the data table, and copying the data table into the electronic form at operation 906.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    querying, via a server executing a form creating application, information provided by at least one network based on a search term;
    receiving, by the form creating application, at least one web page as a result of the query;
    extracting by the form creating application, at least one data table from the at least one web page, the at least one extracted data table comprising at least one column comprising a plurality of cells, a plurality of individually selectable rows or a plurality of individually selectable columns;
    including a column of the one or more individually selectable columns in the electronic form;
    copying the selected column into the electronic form as a drop down list; and
    when the selected column is selected to be copied into the electronic form, creating a form field in the electronic form and populating the form field as a drop down list containing the contents of the selected column via the form creating application.

2. The method of claim 1, further comprising creating a sub-table based on the contents of the at least one extracted data table and by another at least one extracted data table discovered during said querying operation.

3. The method of claim 1, further comprising generating a hierarchical schema, said hierarchical schema being at least one of an extensible markup language (XML)-based schema and an extensible style language family transformation (XSLT)-based schema.

4. The method of claim 1, comprising parsing the at least one column of the at least one extracted data table, wherein the parsing comprises introducing XML code into the at least one extracted data table contents.

5. The method of claim 1, comprising parsing the at least one column of the at least one extracted data table, wherein the parsing comprises introducing HTML code into the at least one extracted data table contents.

6. The method of claim 1, wherein said at least one network comprises the Internet.

7. The method of claim 1, wherein the at least one search term is queried by using a command line interface (CLI) application.

8. The method of claim 1, wherein the at least one search term is pre-defined.

9. The method of claim 1, wherein the at least one search term is provided by a user input.

10. An apparatus, comprising:
    a processor configured to:
    query, via a server, information provided by at least one network based on a search term;
    receive at least one web page as a result of the query;
    extract at least one data table from the at least one web page comprising at least one column comprising a plurality of cells, and a plurality of individually selectable rows or a plurality of individually selectable columns;
    include a column of the one or more individually selectable columns in the electronic form;
    copying the selected column of the extracted data table into the electronic form as a drop down list; and
    when the selected column is selected to be copied into the electronic form, creating a form field in the electronic form and populating the form field as a drop down list containing the contents of the selected column.

11. The apparatus of claim 10, wherein the processor is further configured to create a sub-table based on the contents of the at least one extracted data table and by another at least one extracted data table discovered during said querying operation.

12. The apparatus of claim 10, wherein the processor is further configured to generate a hierarchical schema, said hierarchical schema being at least one of an extensible markup language (XML)-based schema and an extensible style language family transformation (XSLT)-based schema.

13. The apparatus of claim 10, wherein the processor is further configured to introduce XML code into the at least one extracted data table contents.

14. The apparatus of claim 10, wherein the processor is further configured to introduce HTML code into the at least one extracted data table contents.

15. The apparatus of claim 10, said at least one network comprises the Internet.

16. The apparatus of claim 10, wherein the processor is further configured to query the search by using a command line interface (CLI) application.

17. The apparatus of claim 10, wherein the at least one search term is pre-defined.

18. The apparatus of claim 10, wherein the at least one search term is provided by a user input.

19. A non-transitory computer readable storage medium comprising computer code that when executed causes a processor to perform:
    querying, via a server executing a form creating application, information provided by at least one network based on a search term;
    receiving, by the form creating application, at least one web page as a result of the query;
    extracting, by the form creating application, at least one data table from the at least one web page the at least one extracted data table comprising at least one column comprising a plurality of cells, and a plurality of individually selectable rows or a plurality of individually selectable columns;
    including a column of the one or more individually selectable columns in the electronic form;
    copying the selected column into the electronic form as a drop down list; and
    when the selected column is selected to be copied into the electronic form, creating a form field in the electronic form and populating the form field as a drop down list containing the contents of the selected column via the form creating application.

20. The non-transitory computer readable storage medium of claim 19, wherein the processor is further configured to perform creating a sub-table based on the contents of the at least one extracted data table and by another at least one extracted data table discovered during said querying operation.

* * * * *